R. W. SMALLEY.
Draft-Tug Links.

No. 207,904.  Patented Sept. 10, 1878.

WITNESSES  INVENTOR
B. W. Williams  Rolan W. Smalley, by
Jas. H. Reed Jr.  his atty,
  Henry W. Williams Jr.

N. PETERS, PHOTO-LITHOGRAPHER, WASHINGTON, D. C.

UNITED STATES PATENT OFFICE.

ROLAN W. SMALLEY, OF SALEM, MASSACHUSETTS.

IMPROVEMENT IN DRAFT-TUG LINKS.

Specification forming part of Letters Patent No. 207,904, dated September 10, 1878; application filed March 12, 1878.

*To all whom it may concern:*

Be it known that I, ROLAN W. SMALLEY, of Salem, in the county of Essex and State of Massachusetts, have invented a new and useful Attachment for Traces and Wagon Shafts, of which the following is a specification:

The object of this improvement is to provide a means for easing the strain upon the horse when starting his load or drawing it over uneven surfaces, such means being especially intended for application to the shaft or to the trace.

Figure 1:
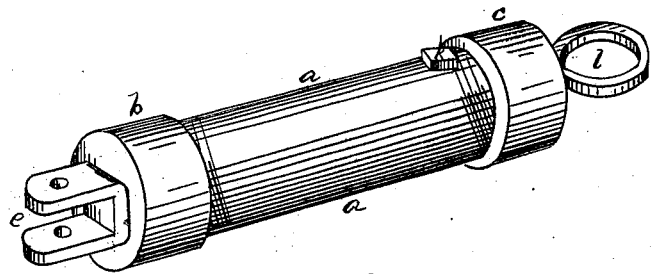
Figure 2:
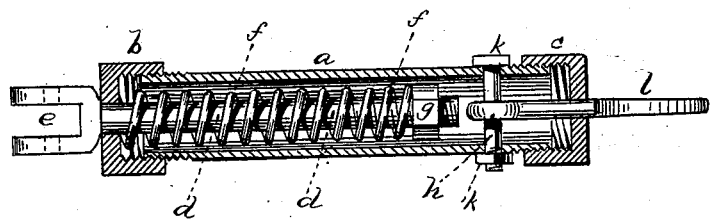

In the accompanying drawing, in which similar letters of reference indicate like parts, Figure 1 is a perspective view of my device. Fig. 2 is a longitudinal section of the same.

$a$ represents a metallic tube, to the opposite ends of which are screwed the caps $b$ and $c$. $d$ is a rod lying within the said tube, passing through the cap $b$, and terminating in the clasp or clamp $e$. $f$ is a spiral spring encircling the rod $d$, and held between the cap $b$ and the nut $g$, which is screwed onto the rod $d$. $h$ is a cross piece or pin passing through the sides of the tube $a$, and held in place by ordinary nuts $k$. Attached to said cross-piece $h$, and extending outward through the cap $c$, is the hook or ring $l$. All the parts above mentioned are usually made of metal.

In attaching this device to a trace the trace is secured in the hook or ring $l$, and the clamp $e$ clasps and holds an end of the whiffletree. One is attached to each trace. As the horse attempts to start his load the spring $f$ contracts and eases the start.

In attaching it to the shafts the clamp $e$ is fixed to a shaft, and the ring or hook $l$ is hooked upon the collar. The effect is the same as before.

It will be observed that the hook or ring $l$ is secured within the tube $a$ by means of the bolt $h$ passing through the walls of said tube and through the inner end of the hook $l$, said bolt being held in place by the nuts $k$, so as to permit of the removal of a worn or broken hook and the ready insertion of a new one.

I am aware that tubes have been heretofore constructed with hooks or rings at the ends thereof, which, operating in connection with an inwardly-projecting rod, provided with a suitable spring, are adapted for the same purpose as that of my present invention; and I do not therefore desire to claim such a construction broadly.

I am also aware of Patent No. 193,927, dated August 7, 1877, and do not desire to claim the construction shown therein; but,

Having thus described my invention, I claim as new and useful—

The combination of the rod $d$, provided with the clamp $e$, and having a spiral spring, $f$, and the hook or ring $l$ attached to the cross-bolt $h$, having nuts $k$, with the tube $a$, provided with the caps $b$ and $c$, the several parts being adapted for operation in connection with each other, substantially as and for the purpose specified.

ROLAN W. SMALLEY.

Witnesses:
HENRY W. WILLIAMS,
L. W. WILLIAMS.